May 1, 1956 — M. E. DOW — 2,743,565
STALK AND BRUSH CUTTING ASSEMBLY WITH FRICTION DRIVE
Filed March 3, 1953 — 3 Sheets-Sheet 1
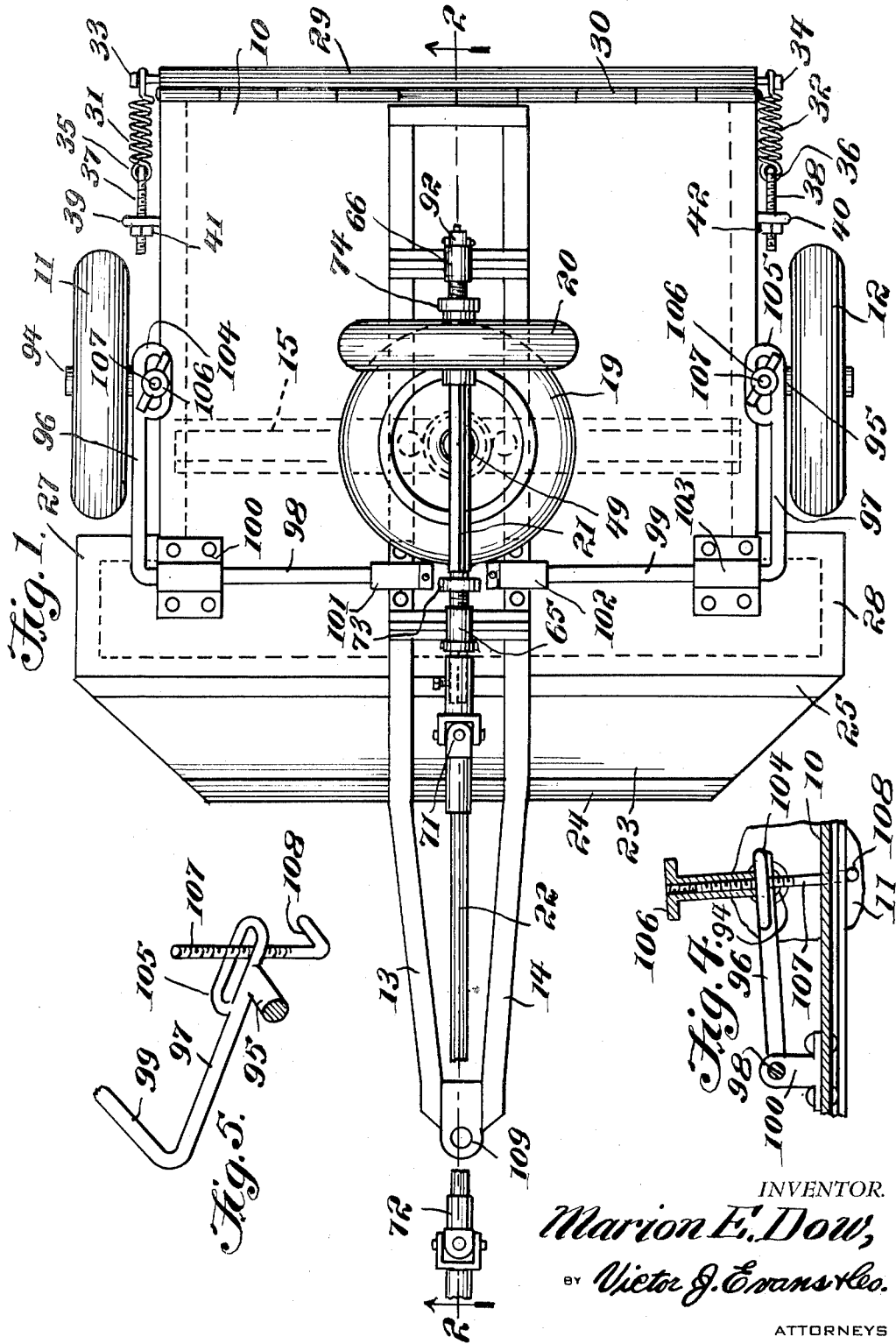
INVENTOR.
Marion E. Dow,
BY Victor J. Evans & Co.
ATTORNEYS

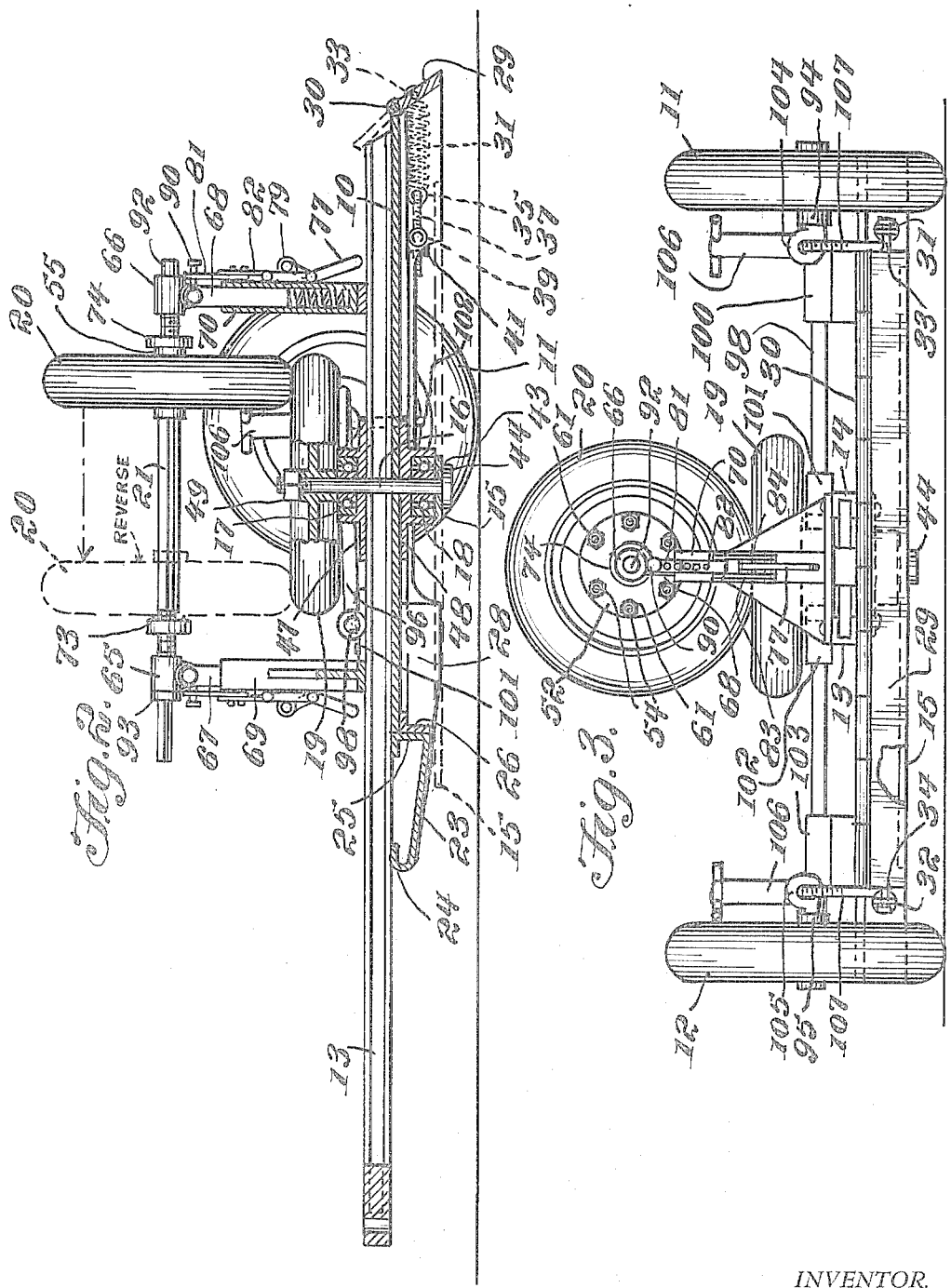

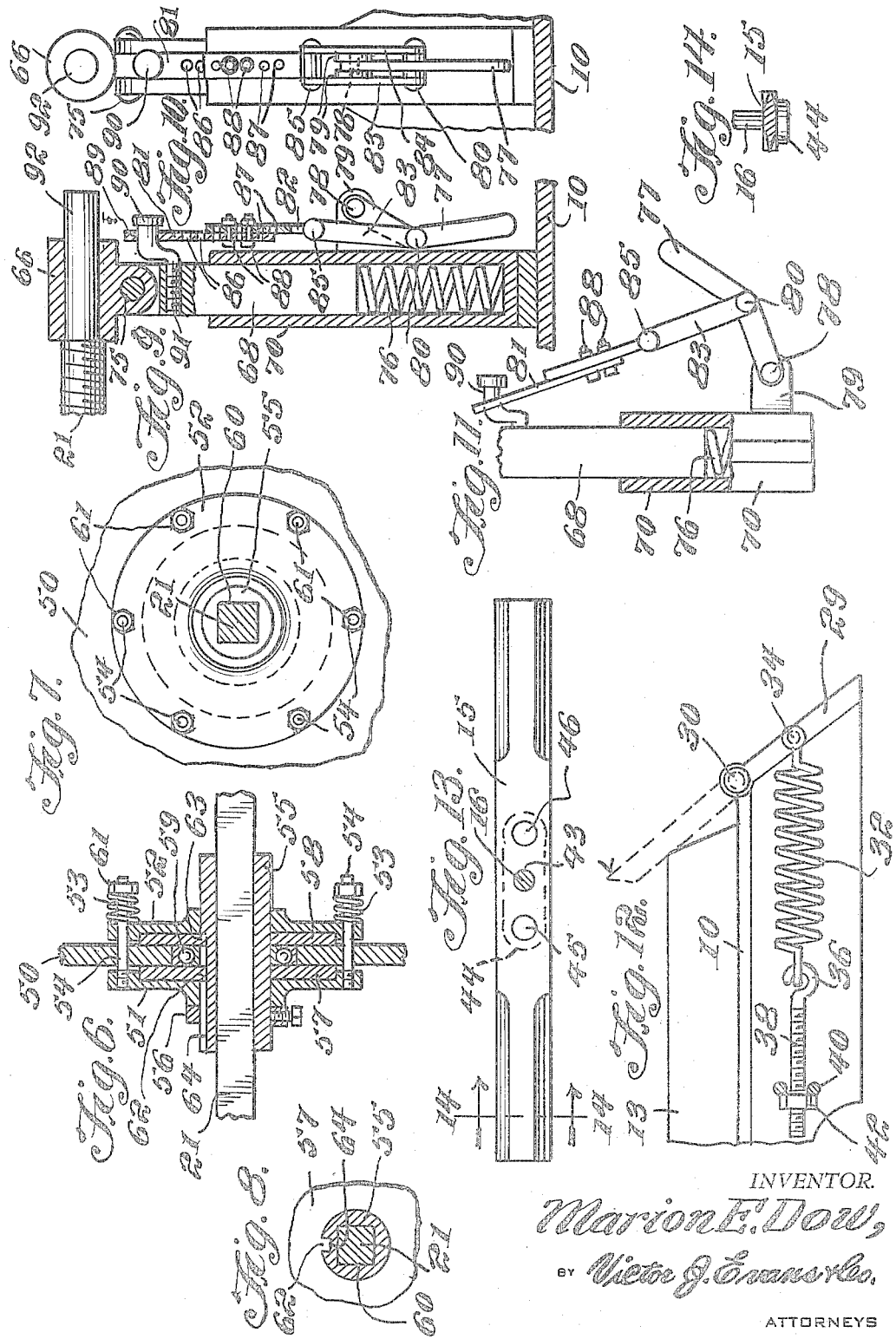

United States Patent Office 2,743,565
Patented May 1, 1956

2,743,565

STALK AND BRUSH CUTTING ASSEMBLY WITH FRICTION DRIVE

Marion E. Dow, Conway, Ark.

Application March 3, 1953, Serial No. 340,113

1 Claim. (Cl. 55—62)

This invention relates to mowing or cutting machines where the cutting blades rotate in a horizontal plane, and in particular a mowing or cutting machine having blades carried on the lower end of a vertically disposed shaft in which the shaft is journaled in a platform and in which the shaft with the cutting blades thereon is rotated by friction wheels or discs driven from the power take-off of a towing vehicle.

The purpose of this invention is to provide an improved stalk and bush cutter wherein blades are positioned to rotate in a horizontal plane in which the sides of the frame are independently adjustable, and in which the direction of rotation of the blades is reversible.

Various types of machines have been provided for removing the stubble, particularly from corn fields and horizontally rotating cutting blades have been used for various purposes, however, because of the uneven terrain and also because of bushes, weeds, and other undergrowth it is difficult to clean the surface of a field from which corn and other crops have been removed to facilitate replanting.

With this thought in mind this invention contemplates a horizontally disposed platform having ground engaging wheels adjustably mounted at the sides with cutters mounted to rotate in a horizontal plane below the platform and with means for driving the cutters in which the direction of rotation of the cutters is reversible.

The object of this invention is, therefore, to provide a cutter mounting in which horizontally rotating cutters may be driven in either direction from the power take-off of a towing vehicle and in which the elevation of the cutters is adjustable.

Another object of the invention is to provide an attachment having cutting blades carried by a vertically disposed shaft in which means is provided for positioning stubble and other trash cut by the cutters in windrows or the like.

A further object of the invention is to provide a stubble and bush cutting attachment for a tractor in which the elevation of the sides of the attachment are independently adjustable and in which the attachment is of a simple and economical construction.

With these and other objects and advantages in view the invention embodies a horizontally disposed platform, ground engaging wheels pivotally and adjustably mounted at the sides of the platform, a vertically disposed shaft having a horizontally positioned friction wheel on the upper end and cutters positioned to travel in a horizontal plane on the lower end, a vertically positioned friction wheel journaled on the platform and adapted to engage the horizontally positioned friction wheel at both sides of the center for rotating the shaft in clockwise and counterclockwise directions, and means for operatively connecting the vertically positioned friction wheel to the power take-off of a towing vehicle.

Other features and advantages of the invention will appear from the following description taken in connection with the drawings, wherein:

Figure 1 is a plan view of the improved stalk and bush cutter, parts of the tongue being broken away.

Figure 2 is a longitudinal section through the cutter, taken on line 2—2 of Fig. 1 with a portion of the driving shaft connecting the cutting elements to the power take-off of a towing vehicle omitted.

Figure 3 is an end elevational view, with parts broken away, looking toward the forward end of the attachment.

Figure 4 is an enlarged fragmentary elevational view, with parts broken away and shown in section, illustrating the adjustable mounting of the wheels of the attachment.

Figure 5 is a perspective view showing the connection of the wheel mounting elements to the wheel adjusting means.

Figure 6 is an enlarged fragmentary elevational view, with parts broken away and shown in section, illustrating the mounting of the vertically disposed friction wheel on the driving shaft therefor.

Figure 7 is an elevational view of the central part of the friction wheel shown in Fig. 6.

Figure 8 is an enlarged fragmentary elevational view, with parts broken away and shown in section, showing a square opening through the hub of the wheel and also showing means for holding a flange of the wheel on the hub.

Figure 9 is an enlarged elevational view with parts broken away and shown in section of one of the adjustable mounting posts of the drive shaft on which the vertically positioned friction wheel is mounted, the parts being shown on an enlarged scale.

Figure 10 is a side elevational view of the post, turned 90°, shown in Fig. 9.

Figure 11 is an enlarged fragmentary elevational view, with parts broken away and shown in section, showing a toggle acting lever of the post shown in Fig. 9 with the lever shown in a released position.

Figure 12 is an enlarged elevational view illustrating the mounting of a gate on the rear end of the platform of the attachment.

Figure 13 is a plan view showing one of the cutting blades of the attachment.

Figure 14 is a section taken on line 14—14 of Fig. 13 showing the cross sectional shape of the blade.

Referring now to the drawings wherein like reference characters denote corresponding parts the improved stubble cutter of this invention includes a horizontally disposed platform 10 carried by wheels 11 and 12 and having a tongue formed with channel shaped elements 13 and 14, a double end cutter blade 15 carried on the lower end of a shaft 16 which is journaled by bearings 17 and 18 in the platform 10, a horizontally disposed friction wheel 19 mounted on the upper end of the shaft 16 and a vertically disposed friction wheel 20 mounted on a shaft 21 which is provided with an extension shaft 22 that extends through a power take-off of a towing vehicle.

The forward end of the platform 10 is provided with an apron or guard 23 having an inclined under surface, the forward end of the guard being provided with an arcuate edge 24 and the rear edge 25 being secured to an angle bar or strut 26 extended across the under surface of the forward edge of the platform. The leading edge of the platform is also provided with extensions 27 and 28 that are positioned forwardly of the wheels 11 and 12, respectively.

The rear end of the platform is provided with an inclined gate 29 which is connected to the trailing edge of the platform with a hinge 30 and, as shown in Figs. 1 and 2 the gate is retained in the closed position, as shown in Fig. 2 with springs 31 and 32 one of the ends of which is attached to pins 33 and 34, extended from the ends of the gate, and eyes 35 and 36 on the opposite ends of which are secured to threaded bolts 37 and 38 that extend through clips 39 and 40, respectively. The ends of the bolts are provided with nuts 41 and 42.

With the gate mounted in this manner the springs are positioned to snap the gate over the center of the hinge 30 whereby as the gate is moved upwardly as indicated by the dotted lines in Fig. 2 the same springs that hold the gate in the lower position, as shown in full lines in Fig. 2 retain the gate in an upwardly extended position wherein the rear end of the platform is open.

The double end cutting blade 15 is mounted on the lower end of the shaft 16 with the shaft extending through an opening 43 in the blade and with a flange 44 on the lower end of the shaft secured to the blade with fasteners 45 and 46. The shaft 16 is journaled in the platform with the bearings 17 and 18 and, as shown in Fig. 2, the bearing 17 is mounted in a socket member 47 mounted on the channels 13 and 14 of the tongue, and the bearing 18 is mounted in a similar socket member 48 mounted on the under surface of the platform 10. The friction wheel 19 is secured on the upper end of the shaft 16 with lock nuts 49.

As illustrated in Fig. 6 the friction wheel 20 is provided with a web 50 which is frictionally held between flanges 51 and 52 with springs 53 on studs 54 and the flanges are freely mounted on a hub 55, the flange 51 being secured in position with a set collar 56. Friction washers 57 and 58 are provided between the web 50 and the flanges 51 and 52, respectively and a ball bearing 59 is provided between the inner surface of the web and hub. With the hub 55 provided with a square or keyed opening whereby it rotates with the drive shaft 21 the friction wheel 20 carried by the web 50 rotates with the shaft whereby should a shock load be applied to the wheel the point at which the web 50 slips between the friction washers 57 and 58 is determined by tension of the springs 53 and this is adjusted by nuts 61 threaded on the ends of the studs 54. The friction washers 57 and 58 are provided with keys 62 and 63 that extend into a keyway 64 in the outer surface of the hub.

The drive shaft 21 is journaled in bearings 65 and 66 on the upper ends of telescoping bars 67 and 68, respectively of the tubular posts 69 and 70. The extended end of the shaft 21 is connected with a universal joint 71 to the extension 22 and the opposite end of the extension 22 is adapted to be connected to the power take-off of a towing vehicle, such as a tractor. For this purpose the extended end of the extension 22 is provided with a socket or clevis 72.

The friction wheel 20 is positioned to engage the upper surface of the wheel 19 and as the shaft 21 is rotated the wheel 19 and the shaft 16 with the cutters on the lower end are rotated whereby the cutters operate in a horizontal plane for cutting stubble and the like. The direction of rotation of the cutters is changed by moving the friction wheel 20 across the center of the wheel 19 or to the position shown in broken lines in Fig. 2. The shaft 21 is provided with adjusting nuts 73 and 74 for adjusting the position of the wheel 20 when the size of the wheel 19 is changed.

As illustrated in Figs. 9, 10 and 11 the bearing 66 is pivotally mounted by a pin 75 on the upper end of the bar 68 and the bar is resiliently held upward by a spring 76 in the lower end of the tubular post 70. The positions of the bearing and bar 68 are controlled by a toggle lever 77 which is pivotally mounted by a pin 78 between lugs 79 extended from the post 70, the intermediate portion of the toggle lever 77 being connected by a pin 80 to links 81 and 82 with arms 83 and 84, the extended ends of which are connected to the links 82 with a pin 85. The links 81 and 82 are provided with spaced openings 86 and 87 through which bolts 88 extend and the upper end of the link 81 is provided with an opening 89 that is positioned on an offset end 90 of a stud 91, and the stud 91 is threaded into the upper part of the bar 68.

By this means the position of the shaft 21 may be adjusted to compensate for wheels of different diameters.

The bearing 65 is adjustably connected to the tube 69 through an assembly of links and levers similar to the assembly adjustably connecting the bearing 66 to the post 70. For this reason the same reference numerals are applied to the connection.

With the bearings 65 and 66 of the shaft 21 mounted in this manner the toggle levers 77 are adapted to be moved outwardly with pins 80 passing over the center of the pins 78 when it is desired to release the friction wheel 19 from the wheel 20, and when it is desired to adjust the frictional contact between the wheels the links 81 and 82 are adjusted by means of the bolt 88 and bolt openings 86 and 87. The shaft 21 is provided with an extension 92 that is positioned in the bearing 66 and the opposite end, which extends through the bearing 65, is provided with a stop 93.

The ground engaging wheels 11 and 12 are journaled on spindles 94 and 95 extended from longitudinally disposed arms 96 and 97 of rods having transversely disposed sections 98 and 99 and, as illustrated in Fig. 1, the rod 98 is journaled in bearings 100 and 101 and the rod 99 in bearings 102 and 103. The section 98 of the arm 96 is provided with a set collar 110 to limit outward movement thereof and a similar collar 111 is provided on the section 99 of the arm 97.

The L-shaped rods for mounting the ground engaging wheels 11 and 12 on the platform of the attachment are formed as illustrated in Figs. 4 and 5 with yokes 104 and 105 on the ends of the arms 96 and 97 and the positions of the wheels in relation to the platform are adjusted by elongated nuts 106 which are threaded on studs 107 that extend through the yokes 104 and 105, as shown in Fig. 5. The lower ends of the studs 107 are provided with pins 108 which, as shown in Fig. 4 extend below the platform 10 limiting downward movement of the platform in relation to the wheels 11 and 12.

The cutter blade 15 is illustrated as having sharp cutting edges positioned on both sides of both ends, as illustrated in Figs. 13 and 14, however it will be understood that a cutter blade of any suitable type may be used.

With the parts arranged in this manner the attachment is connected by a clevis 109 at the forward end of the tongue formed with the channels 14 and 15 and with the coupling or clevis 72 of the extension shaft 22 connected to the power takeoff of the tractor the shaft 16 on the lower end of which the cutting blades are carried is rotated and as the attachment is drawn over a field stubble, weeds, or brush on the field is cut and delivered into windrows with the gate 29 at the end of the platform elevated or with the gate in the position shown in full lines in Fig. 2 refuse may be scattered over the surface of the field.

It will be understood that modifications, within the scope of the appended claim, may be made in the design and arrangement of the parts without departing from the spirit of the invention.

What is claimed is:

In a stubble cutter, the combination which comprises a horizontally disposed platform, a vertically positioned shaft journalled in said platform, a cutter bar carried by the lower end of the shaft and positioned to travel in a horizontal plane below the platform, a horizontally disposed friction wheel mounted on the upper end of the shaft, a vertically disposed coacting friction wheel positioned above the horizontally disposed friction wheel, said vertically disposed friction wheel being arranged in driving relation with respect to said horizontally disposed friction wheel, and said vertically disposed friction wheel being shiftable across the entire width of the horizontally disposed wheel, vertically disposed supporting members mounted on said platform in spaced relation to each other and said support members being arranged on opposite side of said friction wheels, a horizontally disposed shaft journalled at its opposite ends in said supporting members for journalling said vertically disposed coacting friction wheel on the platform, means for shifting said vertically disposed coacting friction wheel on said horizontally disposed shaft across the center of the horizontally disposed friction wheel on the vertically disposed shaft, ground engaging wheels mounted on the sides of the platform, a clevis on said platform extending forwardly thereof for connecting the platform to a towing vehicle, a drive shaft connected to said horizontally disposed shaft for driving said vertically disposed coacting friction wheel by the towing vehicle, means on said vertically disposed supporting members for vertically adjusting said vertical friction wheel with respect to said horizontal friction wheel so as to vary the pressure exerted by said vertical wheel on said horizontal wheel, and a downwardly extended gate hinged to the rear edge of said platform.

References Cited in the file of this patent
UNITED STATES PATENTS

| | | |
|---|---|---|
| 2,540,350 | Root | Feb. 6, 1951 |
| 2,578,880 | Doyle | Dec. 18, 1951 |
| 2,592,991 | Yeager et al. | Apr. 15, 1952 |